United States Patent [19]
Chiarelli

[11] 4,040,566
[45] Aug. 9, 1977

[54] POLLUTION-FREE HEATING SYSTEM

[76] Inventor: Carl Chiarelli, 20 Lake End Road, Merrick, N.Y. 11566

[21] Appl. No.: 613,492

[22] Filed: Sept. 15, 1975

[51] Int. Cl.² ................................................ F24J 3/02
[52] U.S. Cl. ................................ 237/1 A; 236/91 A; 126/400; 431/2
[58] Field of Search ............... 237/1 A; 126/271, 400; 236/91 A, 91 F; 204/129

[56] References Cited

U.S. PATENT DOCUMENTS

| | | | |
|---|---|---|---|
| 3,254,703 | 6/1966 | Thomason | 126/271 X |
| 3,931,806 | 1/1976 | Hayes | 126/400 |
| 3,951,128 | 4/1976 | Schoenfelder | 126/271 |

*Primary Examiner*—William E. Wayner

*Attorney, Agent, or Firm*—Edwin E. Greigg

[57] ABSTRACT

What follows is a description of a system for heating a building by solar energy, and providing heated water for domestic use. A roof-mounted solar heating panel, which includes a clear specially shaped covering panel to intensify the solar energy striking the elements of the heating panel, heats a circulating liquid, which in turn heats air circulated within the building. Surplus heat is stored for a limited time by heating additional quantities of liquid. Also, solar heat is stored for an indefinite time by using a roof-mounted solar battery to power an electrolytic cell used to produce hydrogen and oxygen from water. The hydrogen and oxygen is stored and used as fuel in a furnace which heats the heat transfer liquid in the system as required.

6 Claims, 6 Drawing Figures

POLLUTION-FREE HEATING SYSTEM

BACKGROUND OF THE INVENTION

The present invention relates to a heating system for use in buildings and, more particularly, to a system which utilizes a pollution-free fuel, a solar battery, and a solar heating panel as an energy source for heating the building and providing it with heated water for domestic In recent years, pollution control of all forms has received an ever-increasing amount of attention. Unquestionably, there is a need for a keener awareness of the effects of pollution on the quality of life and for more positive steps for the reduction and elimination of pollution wherever possible. This would seem to be a logical goal, and indeed, steps have been taken in many areas to achieve this goal. Of late, however, the anti-pollution conscience has been jilted by the so-called energy crisis. There is now a countercry for relaxing anti-pollution standards in order to meet increasing demands for energy. For example, buildings which use fuel oil for heating are threatened with shorages.

It would, therefore, be desirable to have a means of heating a building and providing it with heated water for domestic use without sacrificing the goals of anti-pollution and without a reliance on traditional fuels, such as fuel oil.

OBJECTS AND SUMMARY OF THE INVENTION

It is, therefore, an object of the present invention to provide pollution-free means for heating a building and providing it with heated water for domestic use.

It is another object of the invention to provide a pollution-free means for heating a building and providing it with heated water for domestic use which utilizes an abundantly available fuel thereby contributing to an easement of the energy crisis.

It is more specific object of the present invention to provide a system for heating a building and providing it with heated water for domestic use which utilizes solar energy as the heat source.

It is further specific object of the present invention to provide a system for heating a building and providing it with heated water for domestic use which utilizes a pollution-free fuel, such as hydrogen and oxygen.

It is still a further specific object of the present invention to provide a system for heating a building and providing it with heated water for domestic use which utilizes a pollution-free fuel obtained by the electrolysis of water.

It is another object of the present invention to provide a system for heating a building and providing it with heated water for domestic use which utilizes a pollution-free fuel obtained by the electrolysis of water with means for electrolyzing the water including solar means.

These and other objects are accomplished according to the present invention by the provision of a heating system which utilizes heat obtained by solar means and/or the combustion of hydrogen and oxygen and which heats water utilizing these heat sources. The hydrogen and oxygen are preferably supplied by the electrolysis of water, with the means for electrolyzing the water including solar means.

DESCRIPTION OF A PREFERRED EMBODIMENT

Figure 5:
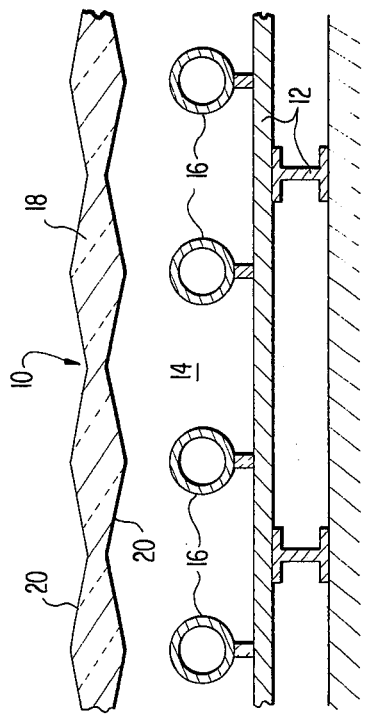
FIG. 5 illustrates a schematic view of a solar heat panel according to the present invention.
Figure 1:
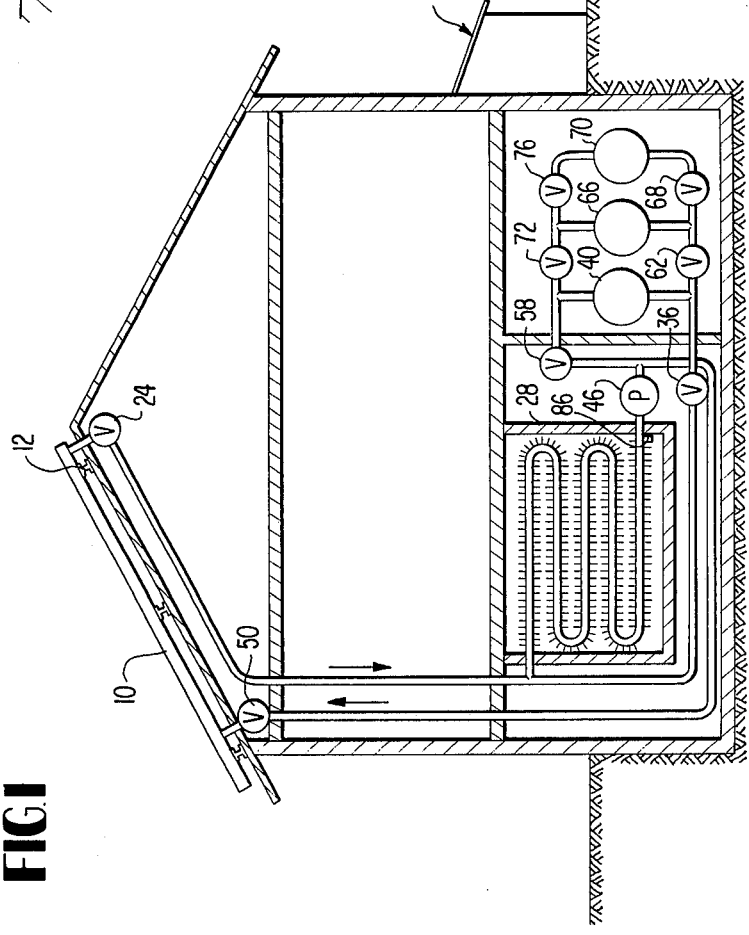
FIG. 1 is an elevation view of a typical installation showing placement and some construction details of the heating system according to the present invention.

As shown in FIGS. 1 and 5, a solar heating apparatus 10 is mounted on the roof of the building by any type of structural support members 12. This apparatus includes a heating panel 14, which is an assembly of parallel pipes 16 through which liquid is circulated to absorb heat from the sun. These parallel pipes can be connected in either a series or parallel flow arrangement, and can be disposed either parallel or at right angles to the slope line of the roof.

This solar heating apparatus also includes a clear glass or plastic panel 18 mounted above and in parallel plane to that of the heating panel 14. This clear panel has a series of convex or smooth ridges 20 parallel to the pipes 16 of the heating panel 14, which act as a lens to focus the sunlight striking this clear panel 18 onto the pipes 16, thereby heating the circulating liquid to a higher temperature than that obtainable without the use of this clear panel 18. This panel 18 also serves to protect the heating panel from weather and debris, and improves the efficiency of heating element by reducing the convection losses.

In the northern hemisphere, the solar heating apparatus 10 ideally would be mounted on a section of the roof, having a southern exposure, at an inclination so that the plane of the apparatus 10 would be normal to the rays of the sun striking it at midday during the winter solstice. However, in many latitudes, this ideal angle of inclination is much greater than the slope of the roof, and, if so mounted, detracts from the appearance of the house. For example, in the New York City area, the ideal angle of inclination is about 45. Thus, the use of this formed clear cover 18 to intensify the rays of the sun striking the pipes 16 allows the solar heating unit 10 to be mounted at the same inclination as that of the roof, and still raise the temperature of the circulating liquid to the value desired.

Figure 2:
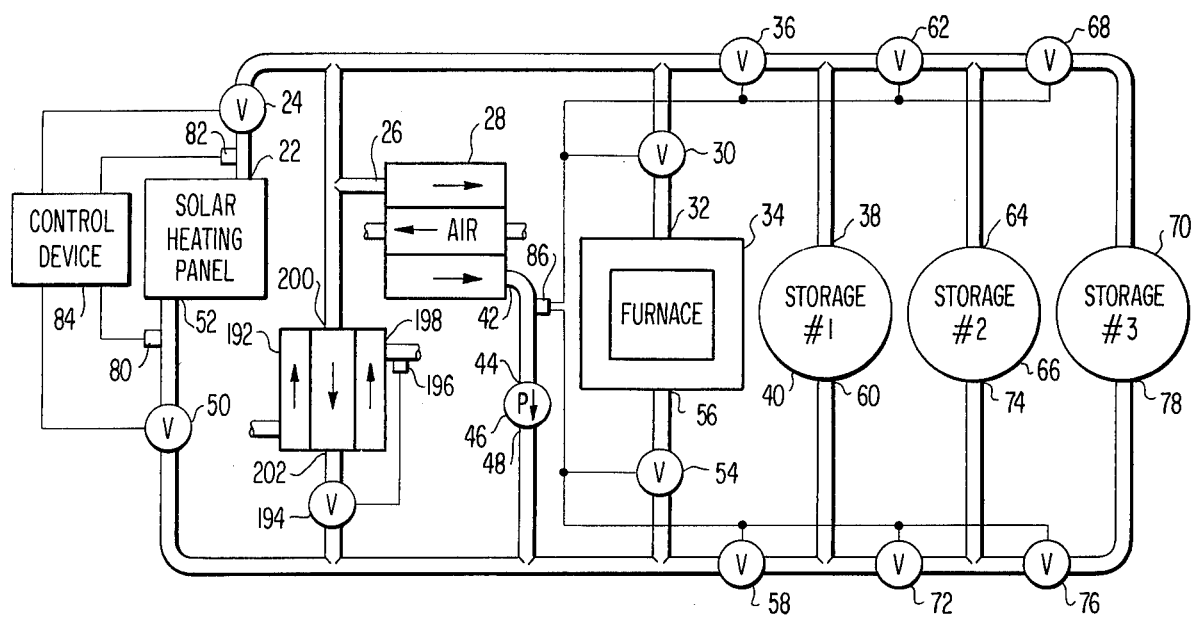
FIG. 2 is a schematic diagram which shows the circulation system for the liquid used as the heat transfer medium in the heating system according to the present invention.

Referring now to the liquid circulation schematic view of FIG. 2, the outlet 22 of the heating panel 14 is connected through an electrically operated valve 24 to the liquid inlet 26 of a liquid-to-air heat exchanger 28, wherein the air circulated throughout the building is heated. The heat exchanger can be made in the form of an insulated plenum, with the liquid circulated through black piping having aluminum fins across which the air to be heated passes, as shown in FIG. 1.

The liquid inlet 26 of the heat exchanger 28 also connects (1) through an electrically operated valve 30 with an outlet 32 of a furnace 34 described herein, and (2) through an electrically operated valve 36 to an outlet 38 of a hot liquid storage tank 40.

The liquid outlet 42 of the heat exchanger 28 connects with an inlet 44 of a circulating pump 46. The outlet 48 of pump 46 connects (1) through an electrically operated valve 50 to an inlet 52 of the solar heating panel 14, (2) through an electrically operated valve 54 to an inlet 56 of the furnace 34, and (3) through an electrically operated valve 58 to an inlet 60 of the liquid storage tank 40.

The outlet 38 of the storage tank 40 is also connected through the electrically operated valve 62 to the outlet 64 of a second storage tank 66, which similarly connects through an electrically operated valve 68 with a third storage tank 70.

The inlet 60 of the storage tank 40 is connected through an electrically operated valve 72 to an inlet 74 of the second storage tank 66, which, in turn, connects through an electrically operated valve 76 to an inlet 78 of the third storage tank 70.

A liquid temperature sensor 80 is disposed near the inlet 52 of the solar heating panel 14 to sense the temperature of entering liquid. Similarly a liquid temperature sensor 82 is disposed near the outlet 22 of the solar heating panel 14 to sense the temperature of liquid leaving the heating panel 14. The outputs of these temperature sensors are supplied to a differential temperature control devices 84 which controls heating panel valves 24, 50. When the outlet temperature exceeds a predetermined high setting, both valves 24, 50 are opened, and remain open for a sufficient time for the passage of liquid through the heating panel 14 to establish a temperature differential between the inlet 52 and outlet 22 of the heating panel 14. Then, so long as this temperature differential exceeds a predetermined number of degrees, these valves remain open. When the temperature differential drops below this predetermined amount, these two valves 24, 50 are closed by the differential temperature control device 84.

There is also a liquid temperature sensing device 86 disposed near the outlet 42 of the heat exchanger 28 to sense the temperature of liquid leaving the heat exchanger. When the temperature exceeds a predetermined high valve, this device 86 opens the first storage tank valves 36, 58. Then, when this temperature exceeds a predetermined higher value, this device 86 opens the second storage tank valves 62, 72. Finally, when this outlet temperature exceeds a still higher predetermined value, this device 86 opens the third storage tank valves 68, 76. These valves remain open until the temperature of liquid leaving the heat exchanger 28 drops to a predetermined value, at which time, all of these valves 36, 58, 62, 72, 68, 76 are closed by device 86.

The device 86 can consist of various commercially available temperature control switches. For example, if the electrically-operated valves 36, 58, 62, 72, 68, 76 are normally closed valves, three single pole, single throw, temperature control switches having an adjustable upper temperature setting at which the switch is opened, can be used to respectively operate the valves 36, 58 for the first storage tank 40, valves 62, 72 for the second storage tank 66, and valves 68, 76 for the third storage tank 70. One such commercially available switch is the Mercoid temperature control switch type DA-35-3, manufactured by the Mercoid Corporation, Chicago, Ill. This switch is rated at 10 amperes at 120 volts, or 5 amperes at 240 volts, and has an adjustable operating range from 100° F., with a minimum difference between the upper and lower temperature settings of 7° F. As an arbitrary example, the temperature switch for the first storage tank valves 36, 58 could be set to open these valves 36, 58 at 140° F., and close them at 130° F., the switch for the second storage tank valves 62, 72 could be set to open these valves 62, 72 at 150° F., and close them at 130° F. or less, and the switch for the third storage tank valves 68, 76 could be set to open these valves 68, 76 at 160° F. and close them at 130° F. or less.

Similarly, the device 86 could include a single pole, single throw temperature control switch having an adjustable upper temperature setting at which the switch is opened, and an adjustable lower temperature setting at which the switch is closed, for operating the furnace valves 30, 54. For example, the Mercoid temperature control switch type DA-35-2, which has the same rating and temperature as the above-mentioned Mercoid switch type DA-35-3, could be used to close these furnace valves 30, 54 at 145° F., and open them at 135° F.

In a similar manner, this temperature sensing device 86 opens the furnace valves 30, 54 at a predetermined low value, and closes these valves at a predetermined high temperature, which is higher than the temperature value at which valves 36, 58 are opened. Thus there is always at least one open return path for the liquid flowing through the heat exchanger 28 and pump 46.

Assume this heating system is started in the early morning, with the only heat being supplied by the furnace 34. As the sun rises and liquid in the solar heating panel is heated, valves 24, 50 are opened, and heat is also added to the liquid circulated through the heat exchanger 28 by passage through the solar heating panel 14.

When the temperature of the liquid leaving the heat exchanger 28 exceeds a set value, valves 36, 58 open to connect the first liquid storage tank 40 into the liquid circulation system. If the temperature of the liquid leaving the heat exchanger 28 continues to rise, the second and third storage tanks 66, 70 will be connected into the liquid circulation system.

These storage tanks are well insulated and serve to store heat, for a limited time, for use when the solar heating unit is inoperative, i.e., during the night or on heavily overcast days.

At some predetermined temperature higher than the lowest opening temperature for the first storage tank, the furnace will be shut down and valves 30, 54 closed. Then all of the heat will be supplied to the heat exchanger 28 from the solar heating panel 14 and one or more of the storage tanks 40, 66 and 70.

When the solar heating panel fails to receive enough solar energy to maintain the minimum required temperature difference between liquid leaving, and liquid entering the heating panel, the temperature control device 84 will close valve 24, 50 and disconnect the heating panel 14 from the circulation system, to reduce loss of heat to the outside from the solar heating panel 14. Then all of the heat will be supplied from one or more of the storage tanks 40, 66 and 70. When the temperature of the liquid leaving the heat exchanger 28 drops below the predetermined low value for the furnace valves 30, 54, the temperature sensing device 86 opens these valves 30, 54. Then all of the heat will be supplied to the heat exchanger 28 from the storage tanks 40, 66, 70, supplemented by the furnace 34.

When the temperature of liquid leaving the heat exchanger 28 drops below the cutoff temperature for the storage tanks, valves 36, 58, 62, 68, 72 and 76 will close to remove these storage tanks from the liquid circulating system, and all of the heat will be supplied by the furnace 34.

Some means must be used to assure that the liquid remaining in the solar heating panel 14 does not freeze in very cold weather. Assuming the liquid used in this system is water, the likelihood of such freezing can be reduced by additives to the water to lower its freezing temperature.

Also, the temperature control device 84 can be used to regulate the valves 24, 50 so that when the temperature sensed by sensor 82 at the outlet of the heating coil 14 approaches the freezing temperature of the liquid, valves 24, 50 are partially opened and regulated to maintain the temperature of the liquid leaving the solar heating coil 14 slightly above its freezing point.

Figure 3:
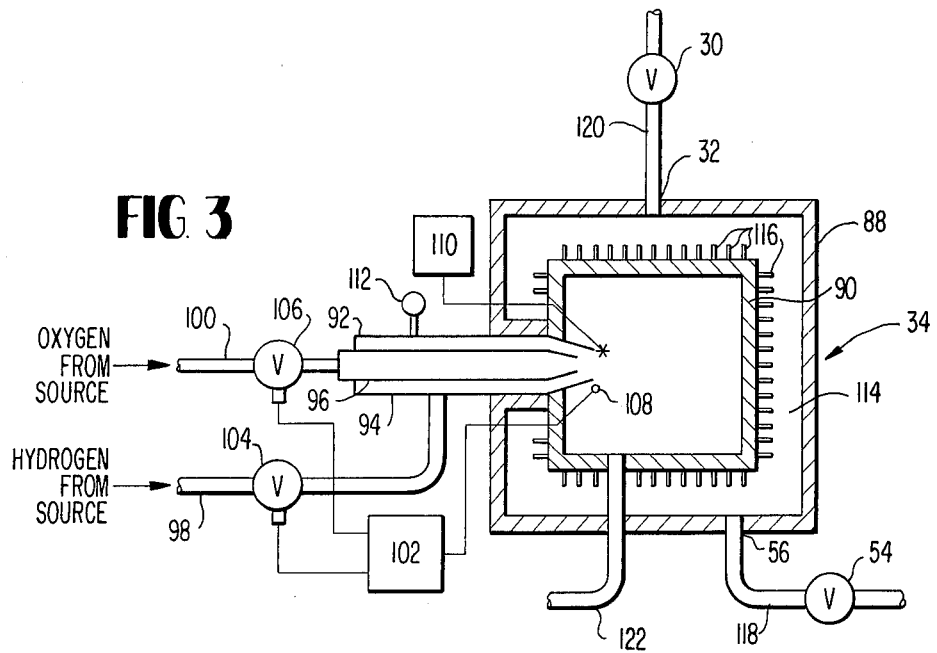
FIG. 3 illustrates a schematic view of a furnace of the heating system according to the present invention including a combustion chamber into which both hydrogen and oxygen are fed for combustion and heat generation.

Turning now to FIG. 3, there is shown the furnace 34 including a heated chamber 88 within which a combustion chamber 90 is situated. Mounted to the heated chamber 88 and combustion chamber 90 is a fuel injection nozzle 92 for injecting fuel into the combustion chamber 90. The fuel injection nozzle 92 is preferably constructed as a compound concentric nozzle including an outer nozzle 94 through which hydrogen is injected into the combustion chamber 90 and an inner nozzle 96 through which oxygen is injected into the combustion chamber 90. The hydrogen is delivered to the nozzle 94 through a line 98 which, in turn, is connected to a hydrogen source. Likewise, the oxygen is delivered to the nozzle 96 through the line 100, which, in turn, is connected to an oxygen source. If additional quantities of hydrogen or oxygen are required, such may be purchased from commercial sources in appropriate tanks and connected to the respective lines 98 and 100. This hydrogen and oxygen is produced at the furnace site by the electrolysis of water by the apparatus illustrated in FIG. 1 and described hereinafter.

The fuel flow is controlled by a control panel 102 which, in turn, is connected to an electrical power source (not shown). The control panel 102 is commercially available, for example, Honeywell models R-4150, R-4127, R-4126 or R-4181 may be used. Wired into the control panel 102 are two solenoid valves 104 and 106, a flame sensor 108 and a transformer 110. The solenoid valves 104 and 106 are connected, respectively, to the hydrogen line 98 and the oxygen line 100. The flame sensor 108 can be, for example, a lead sulfide cell situated within the combustion chamber 90 in the vicinity of the fuel burner assembly 92 for detecting the presence of a flame emanating from the tip of the fuel burner assembly 92. The transformer 110 provides electrical spark ignition of initiating combustion within the combustion chamber 90.

The control panel 102 could be connected to the room thermostats for controlling the use of the furnace. Whether the control panel 102 is manually operated or operated automatically due to its connection to the room thermostats, once initiated it opens the solenoid valve 104 to provide a hydrogen flow to the outer nozzle 94 and a spark from the transformer 110, thereby initiating combustion. Once combustion has been initiated, the flame sensor 108 senses the presence of the flame causing the control panel 102 to open the solenoid valve 106 to provide a flow of oxygen to the inner nozzle 96 for delivery to the flame. By controlling the flow of both the hydrogen and the oxygen, the quantity of heat generated within the combustion chamber 90 can be controlled.

An aspirator 112 may also be provided as shown connected to the nozzle 94 to proportion air into the hydrogen flow at the proper ratio for optimum burning.

The heat generated in the combustion chamber 90 is transferred to the liquid filled space 114 between the combustion chamber 90 and the heated chamber 88, with the heated chamber 88 being sufficiently insulated to ensure against excessive heat losses. Preferably, the outer surface of the combustion chamber 90 is provided with heat transfer fins 116. When the furnace valve 30, 54 are open, liquid from the circulating pump 46 is conveyed through the valve 54 and line 118 into the space 114 where it is heated, and from the space 114 the heated liquid is delivered through the line 120 and valve 30 for circulation to the heat exchanger 28.

Since the product of combustion is water, a line 122 is provided for either draining the water formed from the combustion chamber 90 or delivering the water to a water reservoir. The latter is preferred if a system such as that shown in FIG. 4 is employed.

Figure 4:
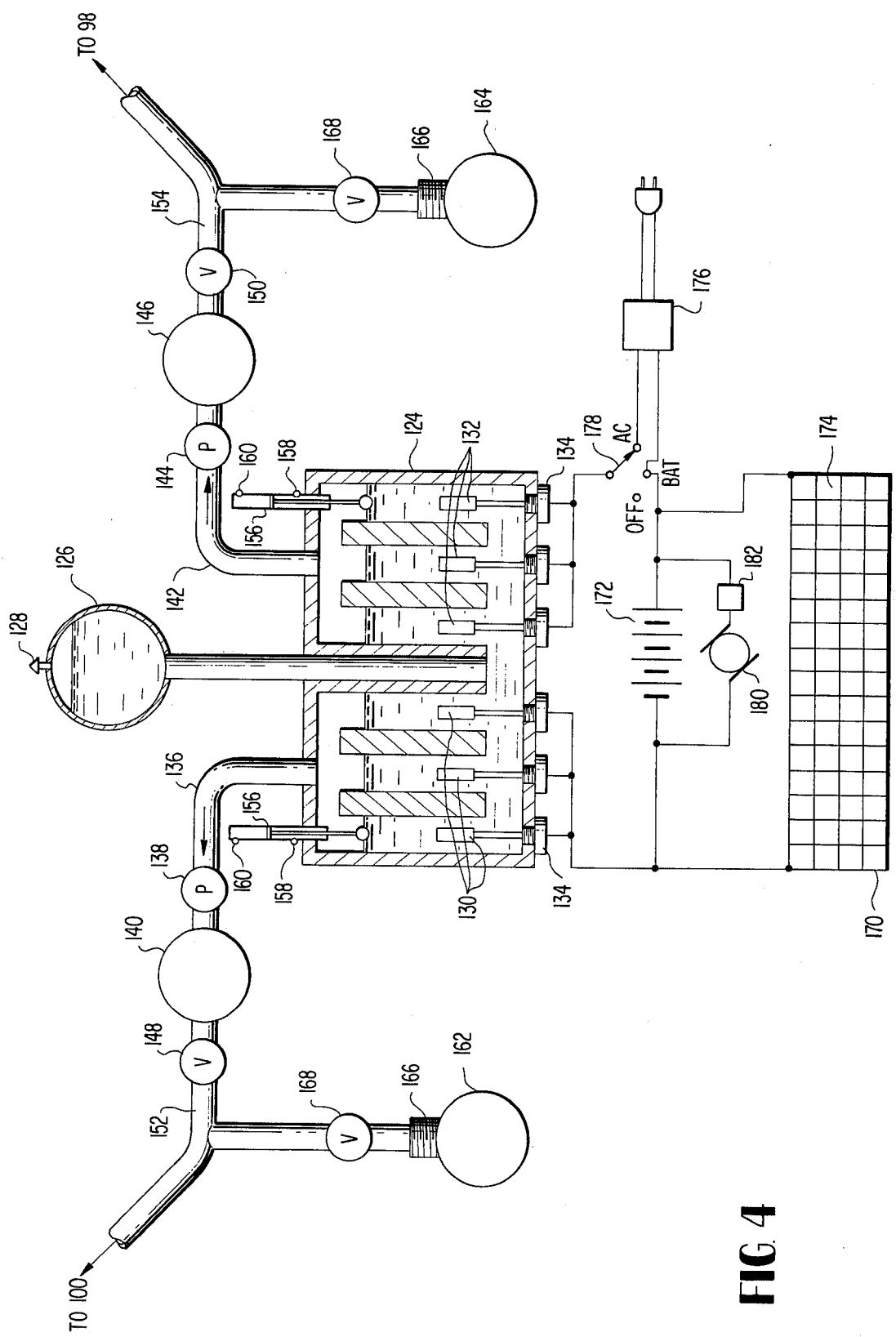
FIG. 4 illustrates a schematic view of one preferred form of a fuel supply system for the furnace illustrated in FIG. 1.

Turning now to FIG. 4, there is shown a system for producing hydrogen and oxygen which may be used in providing the fuel necessary for operating the furnace of FIG. 3. The system provides for the electrolysis of water into its constituent parts of hydrogen and oxygen.

In its essential parts, the system includes a treatment tank 124 which is preferably fabricated as a cast aluminim alloy tank with an interior lined with a suitable non-conductive coating. The tank 124 is filled with water containing a sufficient amount of sulfuric acid, sodium hydroxide or potassium hydroxide or other suitable salt or acid as an electrolyte. The water is supplied from a water reservoir 126 to the tank 124. The water in the reservoir 126 is gravity fed to the treatment tank 124. The reservoir 126 is provided with a vent 128 which permits the electrolyte within the tank 124 to return to its normal level after the hydrogen and oxygen produced in the treatment tank 124 is pumped into their respective holding tanks. Also within the treatment tank 124 there are mounted three anodes 130 and three cathodes 132. Both the anodes 130 and the cathodes 132 are mounted as shown by the insulated threaded keepers 134. In the process of electrolysis, the anodes liberate oxygen, while the cathodes liberate hydrogen. The oxygen which is liberated is drawn through the conduit 136 by the pump 138 into the oxygen holding tank 140. In a like manner, the hydrogen which is liberated is drawn through the conduit 142 by the pump 144 into the hydrogen holding tank 146. From the tanks 140 and 146 the oxygen and hydrogen are delivered, respectively, past the check valves 148 and 150 in the conduits 152 and 154 to the oxygen conduit 100 and the hydrogen conduit 98, respectively.

In each compartment of the treatment tank 124 there is mounted a displaceable float switch 156, each of which is displaceable between the contacts 158 and 160. When the switches 156 reach the contacts 158, the pumps 138 and 144 are actuated causing oxygen and hydrogen to be drawn from the tank 124 to the tanks 140 and 146. Also as a result of the switches 156 engaging the contacts 158, the vent valve 128 is opened causing the water to be gravity fed from the reservoir 126 to the tank 124. This, in turn, results in the water level rising and consequently, the float switches 156 will also rise. When the switches 156 engage the contacts 160, the pumps 138 and 144 are de-activated. The oxygen in the oxygen tank 140 and the hydrogen in the hydrogen tank 146 are retained under pressure in these tanks by the solenoid valves 106 and 104, respectively. When these solenoid valves are opened, as explained above, a flow of oxygen and hydrogen to the inner nozzle and outer nozzle, respectively, results.

As an optional feature of the system shown in FIG. 4, supplementary supply tanks, such as the supplementary oxygen tank 162 and the supplementary hydrogen tank 164, may be provided. These tanks are connected through a coupling and pressure reducer 166 and a shut-off valve 168 to the conduits 152 and 154, respectively.

For added protection against accidental explosion, the oxygen and hydrogen holding tanks 140, 146 can be constructed of non-porous pliable plastic material, and placed in a well-ventilated highly constructed shed. FIG. 1 shows such tanks 140, 146, disposed partly below ground level, in open concrete boxes 145, which are protected from the weather by a fiberglass roof 147.

Figure 6:
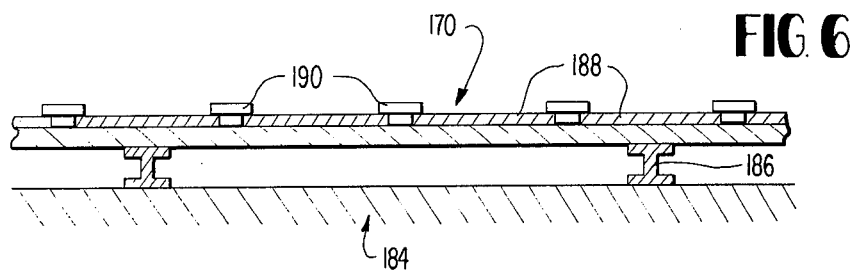
FIG. 6 illustrates a schematic view of a roof mounted solar battery according to the present invention.

Turning now to the power supply aspect of the system shown in FIG. 4, the electrical energy needed to perform the electrolysis of the water in the tank 124 can be supplied by various combinations of the elements of the circuit shown. Preferably, solar means in the form of a solar battery panel 170 can be utilized in conjunction with a conventional-type battery 172. The solar battery 170 can be mounted on the roof of the building (FIG. 6). The solar battery 170 comprises solar cells 174. The battery 172 is placed in parallel with the solar battery 170 so that if the solar battery 170 does not produce sufficient output to sustain the process of electrolysis in the tank 124, then this output can be supplemented by the battery 172. For example, during cloudy days when the solar cells 174 would not be expected to perform at peak efficiency, the battery 172 is always maintained fully charged. Alternatively, the power supply can be provided from the AC source supplied to the building. In this case, a stepdown transformer and rectifier 176 is provided for supplying a DC voltage to the anodes and cathodes. A switch 178 is shown, according to which either battery power or line power can be utilized. In the process of supplying the necessary voltage to the anodes and cathodes, the battery 172 is charged when the line power is utilized. As a further alternative for emergency electrical power in the event of electrical power interruption to the house, a gas powered d. c. generator 180 and a cut-out relay 182 are provided across the battery 172. With this arrangement, the relay 182 ensured that the battery 172 is charged to its full potential. With these arrangements, an adequate power supply to the anodes and cathodes of the treating tank 124 is ensured.

Turning now to FIG. 6, the solar battery 170 is shown mounted to the roof 184 of the building by any known type of structural support members 186, in a similar manner as the solar heating unit 10. The solar battery includes solar cells 188, electrically connected in series and parallel arrangement by interconnection 190 to produce the desired current and voltage from the solar energy absorbed.

If potable water is used as the heat transfer liquid, this water can also be used for domestic purposes. If a liquid other than potable water is used, a hot water heater 192 can be used, wherein the heat transfer liquid is used to heat potable water with the liquid flow through the hot water heater 190 being regulated by a valve 194, which is controlled by a hot water temperature sensing device 196 disposed at the hot water outlet 198 of the hot water heater 192, as shown in FIG. 2. The liquid inlet 200 of the hot water heater can be connected to the liquid inlet 26 of the heater exchanger 28, and the liquid outlet 202 of the hot water heater can be connected to the outlet 48 of the circulating pump 46 through the regulating valve as shown in FIG. 2.

Although valves 36, 62, 68, 58, 72, 76, 30, 54 and 24 are described as electrically operated, it should be understood that they could also be direct acting, heat actuated valves independent of external electrical power.

It should further be understood that valves 36, 62 and 68 could be ordinary flow valves known commercially as B&G Flow Valves.

What is claimed is:

1. A system for heating a building; and providing it with heated water for domestic use comprising in combination:
    a. solar heating means, which includes
        a heating panel comprising a plurality of parallel pipes through which a liquid for transferring heat is circulated; and
        means mounted for exposure to sunlight, for intensifying the sunlight at said plurality of parallel pipes to thereby raise the temperature of the liquid circulated therein;
    b. means mounting said solar heating means to the roof of the building;
    c. heat exchange means to heat air circulated within the building from said liquid;
    d. a liquid circulating means, which includes
        a circulating pump for said liquid,
        connecting means to deliver said liquid from an outlet of said circulating pump to an inlet of said heating panel.
        connecting means to deliver said liquid from an outlet of said heating panel to an inlet of said heat exchange means, and
        means to deliver said liquid from an outlet of said heat exchange means to an inlet of said circulating pump;
    e. means for reducing heat loss from said heating panel during periods of little or no sunshine;
    f. means for heating potable water for domestic use from said liquid;
    g. a plurality of insulated liquid storage tanks, each having an inlet and an outlet;
    h. inlet connecting means which connect said inlets of said storage tanks to said outlet of said liquid circulating pump;
    i. outlet connecting means which connect said outlets of said storage tanks to said inlet of said heat exchange means;
    j. valve means for each liquid storage tank, disposed in said inlet and outlet connecting means, whereby said liquid storage tanks can be successively connected to said circulating means; and
    k. liquid temperature sensing means disposed within said heat exchange means, which successively opens said valve means for each liquid storage tank at a different predetermined high temperature for each liquid storage tank, and closes all valve means for each liquid storage tank at a single predetermined low temperature of said liquid in said heat exchange means.

2. The system as defined in claim 1, wherein said means for reducing heat loss from said heating panel during periods of little or no sunshine, comprises:
 a. inlet valve means disposed in said connecting means between said heating panel inlet and said circulating pump outlet;
 b. outlet valve means disposed in said connecting means between said heating panel outlet and said heat exchange means inlet; and
 e. a differential temperature sensing means which senses the temperature of liquid entering said heating panel and the temperature of liquid leaving said heating panel, which said temperature sensing means closes said inlet and outlet valve means at a predetermined minimum temperature difference between the temperature of liquid leaving, and the temperature of liquid entering said heating panel, and opens said inlet and outlet valve means at a predetermined high temperature of liquid at said outlet of said heating panel.

3. A system for heating a building and providing it with heated water for domestic use comprising in combination:
 a. solar heating means, which includes
  a heating panel comprising a plurality of parallel pipes through which a liquid for transferring heat is circulated; and
  means mounted for exposure to sunlight, for intensifying the sunlight at said plurality of parallel pipes to thereby raise the temperature of the liquid circulated therein;
 b. means mounting said solar heating means to the roof of the building;
 c. heat exchange means to heat air circulated within the building from said liquid;
 d. a liquid circulating means, which includes
  a circulating pump for said liquid;
  connecting means to deliver said liquid from an outlet of said circulating pump to an inlet of said heating panel,
  connecting means to deliver said liquid from an outlet of said heating panel to an inlet of said heat exchange means, and
  means to deliver said liquid from an outlet of said heat exchange means to an inlet of said circulating pump;
 e. means for reducing heat loss from said heating panel during periods of little or no sunshine;
 f. means for storing, for a limited time before utilization, heat transferred from said solar heating panel to said liquid in excess of the heat required to heat the building at the time of transfer;
 g. means for heating potable water for domestic use from said liquid; and
 h. means for converting and storing solar energy for an indefinite time, in the form of gaseous fuel, wherein said means for converting and storing solar energy for an indefinite time, in the form of gaseous fuel comprises
  a water reservoir,
  an electrolytic cell to break down water into its constituent elements, hydrogen and oxygen,
  solar battery means which convert solar energy to electrical energy,
  means for mounting said solar battery means to the roof of the building,
  means for transmitting the electrical energy generated by said solar battery means to said electrolytic cell,
  means for delivering water as required from said reservoir to said electrolytic cell,
  hydrogen storage means,
  means for delivering hydrogen produced in said electrolytic cell to said hydrogen storage means,
  oxygen storage means, and
  means for delivering oxygen produced in said electrolytic cell to said oxygen storage means.

4. The system as defined in claim 3, further comprising means for utilizing said gaseous fuel for heating the building, wherein said means for utilizing said gaseous fuel for heating a building comprises:
 a. a combustion chamber means;
 b. means for delivering hydrogen from said hydrogen storage means to said combustion chamber means;
 c. means for delivering oxygen from said oxygen storage means to said combustion chamber means;
 d. means for metering the hydrogen and oxygen as it is delivered to said combustion chamber for combustion and heat generation within said combustion chamber means.
 e. heated chamber means, having a liquid inlet and outlet, for receiving the heat of combustion and transferring the heat to said liquid passed through said heated chamber for delivery to said heat exchange means;
 f. inlet means connecting said inlet of said heated chamber means to said outlet of said circulating pump;
 g. outlet means connecting said outlet of said heated chamber means to said inlet of said heat exchange means;
 h. valve means disposed in said inlet and outlet connecting means;
 i. a liquid temperature sensing means disposed within said heat exchange means which opens said valve means at a predetermined low temperature of said liquid in said heat exchange means, and closes said valve means at a predetermined high temperature of said liquid in said heat exchange means; and
 j. means for recovering water produced in said combustion chamber as a product of the combustion of hydrogen and oxygen.

5. The system as defined in claim 4, wherein said combustion chamber means is contained within said heated chamber means.

6. The water fueled furnace as defined in claim 8, wherein the building has an alternating current supply, and wherein said electrical power source comprises the electrical power supplied to said building, means for rectifying the alternating current supply to a direct current supply and means for transmitting the direct current to said electrolytic cell.

* * * * *